Aug. 1, 1961 L. L. MOORE 2,994,435
FILTER ELEMENT
Filed May 26, 1958
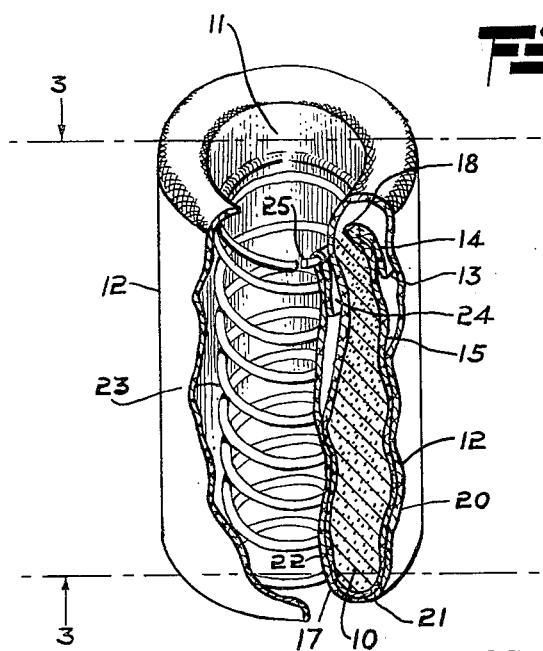
Fig-1-
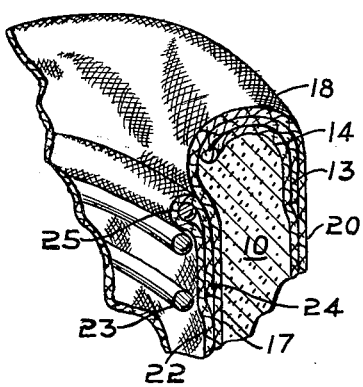
Fig-2-
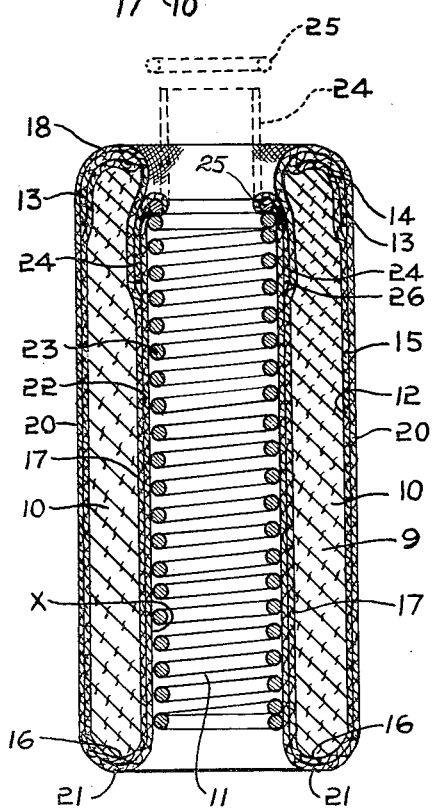
Fig-3-
INVENTOR
LAWRENCE L. MOORE
BY
ATTORNEY

United States Patent Office 2,994,435
Patented Aug. 1, 1961

2,994,435
FILTER ELEMENT
Laurence L. Moore, 2710 Mountain Gate Way,
Oakland, Calif.
Filed May 26, 1958, Ser. No. 737,935
1 Claim. (Cl. 210—484)

This invention relates to improvements in an element used in a fluid filter, and in particular to such elements known in this art as "sock-type" elements.

A "sock-type" element may be broadly identified as one in which the filter mass is contained within a tubular jacket made of a knitted fabric such as is used for stockings and socks worn by most people. Preferably this knitted covering or sheath is wrapped in more than one layer around the filter mass. As pointed out and claimed in my Patent No. 2,314,640, there is a significant advantage gained by enclosing the filter mass inside a porous knitted sleeve, namely, to permit the sleeve to grow as the fluid being filtered carries foreign substances and particles through the fabric pores into the stuffing, causing the latter to grow, and as the latter grows, to expand the sleeve and enlarge the openings in the sleeve, to admit more foreign particles.

As heretofore made, where the knitted sleeve formed a complete one-piece cover enveloping the outside, inside and ends of the filter mass, as shown in my patent named above, it has been the practice to tuck the loose end of the sleeve in behind the coil spring core.

The present invention is intended to solve a problem arising from this practice, because with the end of the knitted sleeve exposed on the outside of the filter jacket and on the side of the filter with the filtered fluid, the ends of the threads, agitated by the fluid flow, become loosened and pass with the fluid into the fluid channels, and thus tend to defeat a purpose of the filter.

Another problem discovered with this construction is that the loose end of the knitted sleeve may get into position against the center tube of the filter and (a) cover the holes through which the filtered oil enters the tube, and (b) block the passage of filtered fluid up or down the core between the center tube of the filter and the inside surface of the filter element.

The object of my present invention, therefore, is to provide an improved filter element, with an improved manner of anchoring the end of the knitted sleeve after it has been wrapped around the filter mass to fully enclose the latter, and thereby cure the foregoing difficulties.

While my Patent 2,314,640 (FIG. 10) shows the use with the sheath of garter springs 9 and 14 to hold the element snug on the outlet pipe 53 of the filter housing, these springs are not necessary on all filter elements, therefore, in the drawings of the present patent, these springs have been omitted. Their presence does not affect the present invention one way or the other.

In the drawings:

FIG. 1 is a view in perspective of the filter element of my invention, substantially cut away to show details to be discussed;

FIG. 2 is a fragmentary view in perspective near the top of the filter element looking from the inside; and FIG. 3 is a diagrammatic view of a cross section of the filter element taken on the line III—III in FIG. 1.

It will be noted in all the drawings that where the knitted sheath is shown in cross section, the usual cross hatching has been omitted. This was done because the cross hatching would have confused the matter and made it difficult to follow the layers of the sheath surrounding the filter mass.

Referring to FIG. 3 in the drawings, the filter element is made by the method disclosed in my earlier Patent No. 2,314,640. Its construction includes the core 10 of fibrous filtering material having an aperture 11 extending therethrough.

This filtering material 10 is enclosed in a unitary tubular sheath 12 of a knitted fabric so it can grow as the filter mass 10 traps in its interstices foreign particles carried into it by the fluid flowing in the direction of the arrow 9.

As shown most clearly in the diagrammatic view of FIG. 3, one end 13 of the sheath lies near the top of the element. Starting at that point, the sheath folds back over the top of the element to form one layer 14 at the top. It then passes down the outside of the element with its wall portion 15 in contact with the filter mass 10. It then folds in under the bottom of the filter mass with its portion 16 forming one layer of the end of the element. It then passes up the inside of the core 10 of the filter mass with its portion 17 in contact with the latter.

At the top, the sheath is again folded back over the top of the element where its portion 18 overlies the end 13 and layer 14 to secure the end in place and to give a plural thickness cover to that portion of the filter mass. The sheath then passes again down the outside of the element with its wall portion 20 lying against the sheath portion 15 to give a double thickness wall to the sheath covering the filter mass. The sheath then folds in under the bottom with its portion 21 lying against the portion 16.

Next, the sheath passes up the inside 11 of the core of the filter mass with its portion 22 forming the second layer of the cover for the filter mass. As shown in FIG. 3 of my Patent No. 2,314,640, the placing of portion 22 of the sheath is accomplished at the same time that the axially extending tubular element (the coil spring 23) is inserted. Insertion of the coil spring along with the upward passing of the sheath portion 22 completes the wrapping of the filter mass. The spring 23 (which may be made of any other form and from other materials) supports the filter mass against compression, both radially and axially.

In filter elements made heretofore, the sheath was ended at bout the point X on the layer 22. The present invention requires that the sheath be made longer so as to provide the portion 24 shown in dotted lines on FIG. 3 before completion of the element and in full lines when completed.

In this present invention, I provide a ring 25 shown in dotted lines above FIG. 3 before being dropped in place around the sheath portion 24. This ring preferably is the same diameter as the coil spring 23. With the sheath portion 24 extended in the dotted line position of FIG. 3, the ring 25 is dropped over the sheath and it comes to rest against the end 26 of the spring with the layer of sheath 24 in between. Then the sheath portion 24 is tucked down into the aperture in the element, so it lies between the layers 17 and 22 of the sheath, as shown in full lines in FIG. 3. This encloses the ring 25 in the sheath and the ring holds the sheath when the end 24 is being forced down between the layers 17 and 22. The end 26 of the sheath is now buried so it cannot unravel or release into the filtered fluid any frayed particles of thread.

It is contemplated that some manufacturers may vary some of the components of this element and that to do so will not depart from the spirit of the invention as defined in the claim hereof.

What I claim is:

A substantially tubular filter element, a tubular knitted fabric cover for said tubular filter element, said tubular cover being applied adjacent one end of said tubular element and encompassing the outer surface thereof sleevewise in a first layer and extending up inside the core as a continuous inner tubular lining, and downwardly over said tubular filter element and over said first applied encompassing layer and upwardly inside said tubular filter element as a second continuous inner tubular lining overlying said first tubular inner lining, said tubular fabric terminating near the point where said tubular fabric was first applied; a cylindrical spring member within the tubular filter element, a ring adjacent one end of said spring, said tubular fabric extending inwardly under said ring and upwardly and outwardly about said ring and downwardly between the last applied inner tubular lining member and the last previously applied inside tubular lining member.

References Cited in the file of this patent

UNITED STATES PATENTS

| | | |
|---|---|---|
| 2,314,640 | Winslow | Mar. 23, 1943 |
| 2,703,650 | Supinger | Mar. 8, 1955 |
| 2,724,176 | White | Nov. 22, 1955 |
| 2,781,619 | Gardes | Feb. 19, 1957 |